US012628190B2

(12) United States Patent
Svendsen et al.

(10) Patent No.: US 12,628,190 B2
(45) Date of Patent: May 12, 2026

(54) METHODS, APPARATUSES AND SYSTEM FOR BEAM ALIGNMENT FOR NR SIDELINK

(71) Applicant: Nokia Technologies Oy, Espoo (FI)

(72) Inventors: Simon Svendsen, Aalborg (DK); Samantha Caporal Del Barrio, Aalborg (DK); Nuno Pratas, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 404 days.

(21) Appl. No.: 18/316,860

(22) Filed: May 12, 2023

(65) Prior Publication Data

US 2023/0389055 A1    Nov. 30, 2023

(51) Int. Cl.
H04W 72/40          (2023.01)
H04W 72/044        (2023.01)

(52) U.S. Cl.
CPC ......... H04W 72/40 (2023.01); H04W 72/046 (2013.01)

(58) Field of Classification Search
CPC ... H04W 72/40; H04W 72/046; H04W 16/28; H04W 92/18; H04B 7/0695; H04B 7/088; H04B 7/06954; H04B 7/06956; H04B 7/0619; H04L 5/0048
See application file for complete search history.

(56) References Cited

U.S. PATENT DOCUMENTS

| | | | |
|---|---|---|---|
| 2006/0075119 A1* | 4/2006 | Hussain | H04L 69/163 |
| | | | 709/227 |
| 2008/0165795 A1* | 7/2008 | Baruch | H04L 49/90 |
| | | | 370/421 |
| 2012/0020250 A1* | 1/2012 | Sundararaman | H04L 49/101 |
| | | | 370/256 |
| 2020/0068549 A1* | 2/2020 | Kang | H04W 16/28 |
| 2020/0186229 A1 | 6/2020 | Raghavan et al. | |

(Continued)

FOREIGN PATENT DOCUMENTS

| | | |
|---|---|---|
| WO | 2020/113246 A1 | 6/2020 |
| WO | 2021/234217 A1 | 11/2021 |

OTHER PUBLICATIONS

"3rd Generation Partnership Project; Technical Specification Group Radio Access Network; NR; Physical layer procedures for data (Release 17)", 3GPP TS 38.214, V17.0.0, Dec. 2021, pp. 1-217.

(Continued)

*Primary Examiner* — Mewale A Ambaye
(74) *Attorney, Agent, or Firm* — McCarter & English LLP

(57)          ABSTRACT

Inter-alia, a method is disclosed that includes transmitting a first set of sidelink beam management reference signals and transmitting a second set of sidelink beam management reference signals. The first set of sidelink beam management reference signals is transmitted on at least one of multiple antenna panels or antenna elements. The apparatus includes the at least one of the multiple antenna panels or the antenna elements or the at least one of the multiple antenna panels or the antenna elements is connectable to the apparatus. The second set of sidelink beam management reference signals is transmitted simultaneously on at least two of the multiple antenna panels or antenna elements. It is further disclosed an according apparatus, program and system.

19 Claims, 7 Drawing Sheets

(56) References Cited

U.S. PATENT DOCUMENTS

| | | | | |
|---|---|---|---|---|
| 2020/0395993 | A1* | 12/2020 | Ryu | H04W 64/00 |
| 2020/0413295 | A1* | 12/2020 | Li | H04W 76/14 |
| 2021/0159963 | A1* | 5/2021 | Akkarakaran | H04L 1/1607 |
| 2021/0160850 | A1* | 5/2021 | Akkarakaran | H04W 76/14 |
| 2021/0194554 | A1 | 6/2021 | Ding et al. | |
| 2022/0022215 | A1 | 1/2022 | Gao et al. | |
| 2022/0046631 | A1 | 2/2022 | Li et al. | |

OTHER PUBLICATIONS

"3rd Generation Partnership Project; Technical Specification Group Radio Access Network; NR; Medium Access Control (MAC) protocol specification (Release 16)", 3GPP TS 38.321, V16.7.0, Dec. 2021, pp. 1-158.

"3rd Generation Partnership Project; Technical Specification Group Radio Access Network; NR; Multiplexing and channel coding (Release 17)", 3GPP TS 38.212, V17.0.0, Dec. 2021, pp. 1-190.

"3rd Generation Partnership Project; Technical Specification Group Radio Access Network; NR; Physical channels and modulation (Release 17)", 3GPP TS 38.211, V17.0.0, Dec. 2021, pp. 1-134.

"New WID on NR sidelink evolution", 3GPP TSG RAN Meeting #94e, RP-213678, Agenda: 8.6.1, OPPO, Dec. 6-17, 2021, 6 pages.

"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-144.

Heng et al., "Six Key Challenges for Beam Management in 5.5G and 6G Systems", IEEE Communications Magazine, vol. 59, No. 7, Jul. 2021, pp. 74-79.

WO PCT Application No. PCT/EP2022/062513, "Method and Apparatus for Beam Management", filed on May 9, 2022, 42 pages.

International Search Report and Written Opinion received for corresponding Patent Cooperation Treaty Application No. PCT/EP2022/064255, dated Dec. 14, 2022, 14 pages.

"Discussion on beam management for NR-V2X sidelink in millimeter-wave bands", 3GPP TSG RAN WG1 Meeting #94, R1-1809039, Agenda: 7.2.4.1.2, Toyota InfoTechnology Center, Aug. 20-24, 2018, pp. 1-7.

Extended European Search Report received for corresponding European Patent Application No. 23173019.3, dated Jul. 14, 2023, 10 pages.

European Examination Report received for corresponding European Patent Application No. 23173019.3, dated Feb. 5, 2026, 7 pages.

* cited by examiner

METHODS, APPARATUSES AND SYSTEM FOR BEAM ALIGNMENT FOR NR SIDELINK

RELATED APPLICATION

This application claims priority to PCT Application No. PCT/EP2022/064255 filed May 25, 2022, which is incorporated herein by reference in its entirety.

FIELD

The following disclosure relates to the field of wireless communications, or more particularly relates to systems, apparatuses, and methods comprising beam alignment for New Radio (NR) sidelink (SL) communication(s) between user equipments (UEs).

BACKGROUND

A conventional beam management procedure between a base station (such as gNB) and a terminal device (such as user equipment, UE) is described in third generation partnership project (3GPP) specification. Here, the UE beam management is defined in three phases Phase #1, Phase #2 and Phase #3. These phases can be described as follows:

Phase #1 (P1):

A respective UE uses a broad Rx beam while the gNB is performing SS bursts where Synchronization Signal/Physical Broadcast Channel (PBCH) blocks (SSBs) are swept and transmitted in different angular directions covering the cell. The UE measures the reference signal received power (RSRP) for all SSB beams on all UE panels and sends a preamble for random access over the physical random access channel (PRACH) on the random access channel (RACH) Occasion of the best SSB beam to connect to the network with the reciprocal transmit (Tx) beam of the best SSB beam.

Phase #2 (P2):

The UE uses a broad Rx beam to receive the gNB refined Downlink Channel State Information Reference Signal (DL CSI-RS) beam sweeping within the connected SSB beam. The UE measures the RSRP for all CSI-RS beams and reports the best beam ID (s) back to gNB still using the reciprocal broad Tx beam.

Phase #3 (P3):

The gNB transmits a repeated CSI-reference signal with the selected beam based on the UE reporting in Phase #2 and the UE sweeps refined Rx beam settings to identify its best narrow Rx beam. At the end of Phase #3, the beam alignment between the gNB Tx beam and the UE Rx beam is obtained enabling maximized directional gain.

One of the steps in SL beam management (and also in Uu) is an initial beam-pairing (also referred to as Phase 1) and further alignment with a narrower Tx beam (also referred to as Phase 2). Taking as basis a Uu beam management procedure (i.e. between a gNB and a UE, as described above with P1 to P3), then the SL initial beam-pairing between a so-called primary UE, P-UE, and a secondary UE, S-UE could be with the following steps occurring between the P-UE and the S-UE:

Step 0:

Discovery procedure, e.g. following Prose and discovery model A or B. For the case of vehicle-to-anything (V2x) communications, the discovery occurs at the V2x layer and is enabled by the exchange of Cooperative Awareness Messages (CAMs) in the Intelligent Transport System (ITS) band at 5.9 GHz;

a. The discovery procedure can occur in either FR1 or FR2. However, the benefit of doing this in FR1 is the absence of the need to perform beam-based discovery. If applied at FR2 then it will need to be performed with (e.g. only) wide beams, so discovery can be limited in coverage and take a long time for devices only capable of transmitting from a single panel at the time (current smartphone UE implementation);

Step 1:

The P-UE and S-UE establish a unicast link via PC5 connection establishment;

a. This can either be performed at FR1 or FR2;

Step 2:

The P-UE or S-UE trigger initial beam alignment;

a. Such a trigger can occur at either FR1 or FR2, and can indicate configuration details on the beam alignment (e.g. SL Beam Management Reference Signals (SL-BMRS) format to be used, number of expected beam sweeps, the time period where the beam sweeps are expected etc.);

Step 3:

The P-UE performs the Wide SL-BMRS beam sweep;

a. This step may be dedicated to FR2. The slot format used to transmit these SL-BMRS for the purpose of beam sweeping can be (e.g. pre-)defined. However, it may be assumed that a respective (e.g. each) individual SL-BMRS is transmitted in a single SL slot. Therefore, if four wide beam sweeps are required, then the P-UE will have to transmit four distinct SL slots, each with a different beam applied;

Step 4:

The S-UE reports to the P-UE what was the best wide SL-BMRS beam (e.g. the index or slot of the SL-BMRS beam received with the higher power);

a. This report can be transmitted in FR1 or FR2;

b. This corresponds to the completion of P1;

Step 5:

The P-UE performs the Narrow SL-BMRS beam sweep;

a. This step is dedicated to FR2. As in step 3, here it is assumed that this sweep will utilize a single SL slot per beam sweep;

Step 6:

The S-UE reports to the P-UE what was the best narrow SL-BMRS beam.

a. This report can be transmitted in FR1 or FR2;

b. This corresponds to the completion of P2;

It is noted that in the procedure as disclosed above it is assumed that the S-UE (e.g. only) applies a wide beam for its reception and transmission. Therefore, at the end of the procedure (e.g. only) a combination of P-UE narrow beam (s) and S-UE wide beam(s) may have been identified. In case there is a need to identify a narrow beam e.g. for the S-UE, then e.g. additional beam sweeps may be required to be performed from the S-UE side. These sweeps can be Tx based (i.e. the S-UE transmits different beams and then the P-UE reports back what is the best beam) or Rx based (i.e. the S-UE applies different Rx beams to the P-UE transmission, with the assumption that the P-UE applied beam does not change).

SUMMARY OF SOME EXEMPLARY EMBODIMENTS

One drawback of above disclosed procedure applied to NR SL communications is the number of beam sweeps required for setting up the beam alignment. For instance, assuming a P-UE with four panels, each adapted to transmit e.g. seven narrow beams. Then it will be required four wide beam sweeps and seven narrow beam sweeps to find the best P-UE narrow beam, which leads to additional power consumption on the UEs and latency in beam alignment. The second drawback is that if the P-UE has to communicate with multiple S-UEs (e.g. the P-UE has multiple unicast SL-links operating at FR2), then it will have to replicate this procedure with each individual S-UE, which proportionally increases the number of beam sweeps per S-UE on part of the P-UE. In the best case, for two S-UEs it will be needed four wide beam sweeps and 14 narrow beam sweeps (when assuming that the two S-UEs are at different panels). For three S-UEs, this becomes four wide beam sweeps and 21 narrow beam sweeps.

It is thus, inter alia, an object to enhance a beam alignment procedure in sidelink communications, in particular by reducing a number of required reference signals to be transmitted for initial beam alignment. Further, it is an object to achieve a higher number of required reference signals for beam alignment, particularly for busy networks e.g. at least 18 reference signals for two UEs connecting to a single node/device. Further, most current UEs are implemented with a single layer Tx RF architecture resulting in increased latency and power consumption during such a beam alignment procedure. Another object aims to reduce them.

According to a first exemplary aspect, a method is disclosed, the method comprising:

transmitting a first set of SL-BMRS, sidelink beam management reference signals; and transmitting a second set of SL-BMRS;

wherein the first set of SL-BMRS is transmitted on at least one of multiple antenna panels or an antenna elements comprised by or connectable to the apparatus, and wherein the second set of SL-BMRS is transmitted simultaneously on at least two of the multiple antenna panels or antenna elements.

This method may for instance be performed and/or controlled by an apparatus, for instance a terminal device, a user equipment, or a user device. For instance, the method may be performed and/or controlled by using at least one processor of the terminal device, user equipment, or user device. Such a terminal device, user equipment, or user device may also be referred to as primary-UE in the following. The apparatus may comprise multiple antenna panels or antenna elements that are comprised by or connectable to the apparatus.

According to a second exemplary aspect, a method is disclosed, the method comprising:

receiving a first set of SL-BMRS, sidelink beam management reference signal; and receiving a second set of SL-BMRS;

wherein the first set of SL-BMRS and the second set of SL-BMRS is received on at least one of an antenna panel or an antenna element comprised by or connectable to the apparatus; and determining a beam report information indicative of a quality information about at least one beam of the first set of SL-BMRS and at least one beam of the second set of SL-BMRS.

This method may for instance be performed and/or controlled by an apparatus, for instance a terminal device, a user equipment, or a user device. For instance, the method may be performed and/or controlled by using at least one processor of the terminal device, user equipment, or user device. Such a terminal device, user equipment, or user device may also be referred to as secondary-UE in the following. The apparatus may comprise the at least one antenna panel or antenna element that is comprised by or connectable to the apparatus.

According to a further exemplary aspect, a computer program is disclosed, the computer program when executed by a processor causing an apparatus, for instance a server, to perform and/or control the actions of the method according to at least one of the first or second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to at least one of the first or second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to at least one of the first or second exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising:

an apparatus according to the first exemplary aspect as disclosed above, and one or more apparatuses according to the second exemplary aspect as disclosed above.

Any disclosure herein relating to any exemplary aspect is to be understood to be equally disclosed with respect to any subject-matter according to the respective exemplary aspect, e.g. relating to an apparatus, a method, a computer program, and a computer-readable medium. Thus, for instance, the disclosure of a method step shall also be considered as a disclosure of means for performing and/or configured to perform the respective method step. Likewise, the disclosure of means for performing and/or configured to perform a method step shall also be considered as a disclosure of the method step itself. The same holds for any passage describing at least one processor; and at least one memory including computer program code; the at least one memory and the computer program code configured to, with the at least one processor, cause an apparatus at least to perform a step.

For convenience, a list of abbreviations used in the following is already given at this point:

AMF Access and Mobility Management Function
BMRS Beam Management Reference Signals
CE Control Element
CSI Channel State Information
CSI-RS Channel State Information Reference Signal
CQI Channel Quality Indicator
DMRS Demodulation Reference Signal
FR1 Frequency Range (e.g. 410 MHz-7125 MHz)
FR2 Frequency Range (e.g. 24.25 GHz-52.6 GHz)
gNB next Generation Node B
ITS Intelligent Transport System
MAC Medium Access Channel
MCS Modulation and Coding Scheme
NR New Radio
NW Network
OTA Over The Air
PRACH Physical Random Access Channel
PMI Precoding Matrix Indicator
PSCCH Physical Sidelink Control Channel
PSSCH Physical Sidelink Shared Channel
PSFCH Physical Sidelink Feedback Channel
RACH Random Access Channel
RF Radio Frequency
RI Rank Indicator
RSRP Reference Signal Received Power
Rx Receive/Receiver
SCI Sidelink Control Information
SL Sidelink
SL-BMRS Sidelink Beam Management Reference Signal (s)
SSB Synchronization Signal/PBCH Block
Tx Transmit/Transmitter
UE User Equipment (also referred to as user device)
V2X Vehicle-to-Anything In the following, exemplary features and exemplary embodiments of all aspects will be described in further detail. The features and example embodiments described above may equally pertain to the different aspects.

As used herein, the term SL Beam Management Reference Signal(s) (BMRS) is used to refer to one or more sequences to be used to aid on the beam alignment. However, these sequences can also be referred to as Beam Alignment Reference Sequence (BARS), or SL Channel State Information (CSI).

According to an example embodiment of all exemplary aspects, the first set of SL-BMRS corresponds to a wide beam group. Such a wide beam group may comprise at least one wide beam. The wide beam group may be indicative of at least one wide SL-BMRS beam.

A respective wide beam of the wide beam group may refer to a beam that is transmitted by an antenna element or antenna panel comprised by or connectable to the apparatus. Such a wide beam may be transmitted or emitted in all angular directions that the respective antenna element or antenna panel can transmit or emit the beam.

According to an example embodiment of all exemplary aspects, the second set of SL-BMRS corresponds to a narrow beam group. The narrow beam group may comprise at least one first narrow beam and at least one second narrow beam. The narrow beam group may be indicative of at least a first narrow SL-BMRS beam and a second narrow SL-BMRS beam, wherein a respective narrow beam is narrower than the at least one SL-BMRS wide beam of the wide beam group.

Contrary to a respective wide beam of the wide beam group, a respective narrow beam of the narrow beam group is transmitted or emitted in a narrower angular direction than the respective wide beam. Thus, in other words, a respective wide beam is transmitted or emitted in such a way that an entire area of a coverage area in which signals or beams transmitted or emitted by the respective antenna element or antenna panel can be observed. A respective narrow beam may in contrast then not be observable throughout this (e.g. entire) coverage area (covered by a respective wide beam).

According to an example embodiment of the first exemplary aspect, the second set of SL-BMRS corresponds to a narrow beam group comprising at least one first narrow beam and at least one second narrow beam, wherein the narrow beam group is indicative of at least a first narrow SL-BMRS beam and a second narrow SL-BMRS beam, wherein a respective narrow beam is narrower than the at least one SL-BMRS wide beam of the wide beam group, wherein the at least one second narrow beam is transmitted subsequently to the at least one first narrow beam.

The wide beam group may comprise or be indicated of one or more (e.g. wide) SL-BMRS beams to be transmitted respectively emitted. The narrow beam group may comprise or be indicated of one or more (e.g. narrow) SL-BMRS beams that are narrower than a respective SL-BMRS beam of the wide beam group. The one or more SL-BMRS beams of the narrow beam group together, however and when transmitted or emitted, may also cover the entire coverage area in which signals or beams transmitted or emitted by the respective antenna element or antenna panel can observe a respective wide beam.

A respective wide beam of the wide beam group is transmitted on at least one of an antenna panel or an antenna element. The apparatus according to the first exemplary aspect may comprise or be connectable to two or more antenna elements and/or antenna panels. For instance, the apparatus may comprise or be connectable to four antenna panels and/or antenna elements, so that via these antenna elements or antenna panels, (e.g. wide) beams in four different directions of the apparatus may be transmitted or emitted.

Such a wide beam group may have e.g. four SL-BMRS beams defined, e.g. SL-BMRS #1-4. The wide beam group may define that a respective wide SL-BMRS beam corresponds to a single antenna panel or antenna element of e.g. all antenna elements of antenna panels of the apparatus according to the first exemplary aspect. In other words, a respective wide SL-BMRS beam corresponds to a wide SL-BMRS beam within a respective antenna panel or antenna element of the apparatus according to the first exemplary aspect.

Such a narrow beam group may have e.g. seven SL-BMRS beams defined, e.g. SL-BMRS #5-11. The narrow beam group may define that a respective narrow SL-BMRS beam corresponds to a single antenna panel or antenna element of the apparatus according to the first exemplary aspect, and when put together, the narrow SL-BMRS beams cover the coverage area of a single broad beam.

Then, the apparatus according to the first exemplary aspect (e.g. a P-UE) may transmit (e.g. send) a respective (e.g. wide) SL BMRS sequentially on each broad beam, e.g. SL-BMRS #1-4 as part of the wide beam group.

The apparatus according to the first exemplary aspect (e.g. a P-UE) may transmit (e.g. send) simultaneously a respective narrow beam, e.g. starting with narrow SL-BMRS beam SL-BMRS #5 as part of the narrow beam group from (e.g. all) antenna elements or antenna panels.

Further, the apparatus according to the first exemplary aspect (e.g. a P-UE) may transmit (e.g. send) simultaneously narrow beams, SL-BMRS #6 to SL-BMRS #11 as part of the narrow beam group sequentially from (e.g. all) antenna elements or antenna panels.

The at least one wide beam, and at least a first and a second narrow beam may be received (e.g. observed) by the apparatus according to the second exemplary aspect, which may determine a respective wide beam, and/or a respective narrow beam which the apparatus according to the second exemplary aspect has observed (e.g. received and/or measured) with a highest received signal power—RSRP, for instance. The result may be provided (e.g. sent) back from the apparatus according to the second exemplary aspect to the apparatus according to the first exemplary aspect.

This may allow one or more of the following:

A single report needed from S-UE (e.g. apparatus according to the second exemplary aspect) to P-UE (e.g. apparatus according to the first exemplary aspect) at the end of the two group sweeps (wide beam group and narrow beam group), in contrast with e.g. two reports needed in the alternative;

A fixed number of beam sweeps needed when performing the simultaneous alignment between the P-UE and one or more (e.g. multiple) S-UEs;

Flexible to any number of panels at the Tx UE and compatible with Single Tx RF architectures.

By transmitting or emitting the first narrow beam and the second narrow beam by a respective antenna element or antenna panel, those narrow beams are swept by the apparatus according to the first exemplary aspect.

Any of the disclosed apparatuses (according to the first and/or according to the second exemplary aspect) may be stationary device or a mobile device. The apparatuses may in particular be a mobile device, such as a smartphone, a tablet, a wearable, a smartwatch, a low power device, an IoT device, an IIoT device, a vehicle, a truck, a drone, an airplane, or the like, or comprised by such a device. The apparatus (e.g. according to the first and/or according to the second exemplary aspect) may in particular be capable of communicating with (transmitting and receiving signals and/or data to/from) one or more other apparatuses (e.g. according to the second or according to the first exemplary aspect, depending on whether the apparatus transmitting and receiving signals is of the first or second exemplary aspect) and/or a network device, such as a base station of a communication network. Generally, the apparatuses may also be any device enabled for communication with a communication network and/or another terminal device.

Such a network device may be understood as a wireless communication station installed at a fixed or mobile location and may in particular be or comprise an entity of the radio access network of the communication system. For instance, the network device may be, comprise, or be part of a base station of a communication network of any generation (e.g. a gNB, eNodeB, NodeB, BTS or the like) of 3GPP standard. Generally, the network device may be or comprise a hardware or software component implementing a certain functionality. For instance, in an example, the network device may be a location management function, LMF. In an example, the network device may be an entity as defined by 3GPP 5G or NR standard (also referred to as gNB). Accordingly, while the network device may be understood to be implemented in or be a single device or module, the network device may also be implemented across or comprise multiple devices or modules. As such, the network device may in particular be implemented in or be a stationary device. Multiple network devices of the exemplary aspect may in particular establish a communication system or network, which may in particular be a New Radio (NR) or 5G system (5GS) or any other mobile communications system defined by a past or future standard, in particular successors of the present 3GPP standards. The network device of the exemplary aspects may be capable of being in direct and/or indirect communication with the exemplary terminal device.

The apparatus according to the first and the apparatus according to the second exemplary aspect may be in certain proximity to each other, such that a direct communication via SL, i.e. without a base station, is possible. The apparatus according to the first and the apparatus according to the second exemplary aspect may be served by the same or different cells and/or base stations, or at least one of the apparatuses may be out of coverage (i.e. temporarily not served by any base station). It is noted, that while the example embodiments provided herein are described with respect to the apparatus according to the first exemplary aspect or the second exemplary aspect, the apparatus according to the second exemplary aspect, vice versa the apparatus according to the first exemplary aspect may of course be in SL communication with various other apparatuses, so that a respective UE can act both as an apparatus according to the first exemplary aspect and as an apparatus according to the second exemplary aspect. Accordingly, the apparatus according to the first (or second) exemplary aspect may then perform the described steps/actions with respect to multiple apparatuses according to the second (or first) exemplary aspect. For instance, the apparatus according to the first exemplary aspect may receive beam report information from multiple apparatuses according to the second exemplary aspect.

According to an exemplary embodiment of all exemplary aspects, a respective wide beam of the wide beam group is transmitted respectively received simultaneously on the multiple antenna panels or antenna elements.

According to an exemplary embodiment of the first exemplary aspect, two respective wide beams of the wide beam group are transmitted sequentially on at least two (e.g. different) antenna panels or antenna elements of the multiple antenna panels or antenna elements.

A respective wide beam of the wide beam group may be transmitted or emitted simultaneously on (e.g. all) antenna panel(s) or antenna element(s) of the apparatus of the first exemplary aspect. Additionally or alternatively, in case the wide beam group comprises or is indicative of more than one (e.g. wide) SL-BMRS beam, the respective wide beams of the wide beam group may be transmitted or emitted sequentially on (e.g. all) antenna panel(s) or antenna element(s) of the apparatus. Additionally or alternatively, in case the wide beam group comprises or is indicative of more than one wide SL-BMRS beam, e.g. all wide beams of the wide beam group may be transmitted or emitted sequentially, wherein one wide beam of the wide beam group is transmitted or emitted via one (e.g. dedicated) antenna element or antenna panel of the apparatus. Additionally or alternatively, in case the wide beam group comprises or is indicative of more than one wide SL-BMRS beam, e.g. all wide beams of the wide beam group may be transmitted or emitted simultaneously, wherein one wide beam of the wide beam group is transmitted or emitted via one (e.g. dedicated) antenna element or antenna panel of the apparatus.

A respective narrow beam of the narrow beam group is transmitted or emitted simultaneously on at least two of the multiple antenna panels or the antenna elements comprised by or connectable to the apparatus according to the first exemplary aspect. Thus, A respective narrow beam may be transmitted or emitted on (e.g. all; e.g. at least two) antenna elements or antenna panels of the apparatus. This may be repeated (e.g. sequentially) with another, different narrow beam of the narrow beam group until e.g. all respective narrow beams as comprised by or for which the narrow beam group is indicative of are transmitted or emitted via the respective antenna elements or antenna panels.

This may allow e.g. optimized P1 and P2 phases in SL communication(s), e.g. by enabling the apparatus according to the first exemplary aspect (e.g. a P-UE) to divide one or more SL-BMRS beams (in case of more than one beam it may also be referred to as sweeps) into the wide beam group and the narrow beam group. The SL-BMRS beams belonging to the wide beam group, will be transmitted sequentially as one wide beam e.g. per antenna element or antenna panel by apparatus according to the first exemplary aspect, while (e.g. simultaneously to the wide SL-BMRS beam(s), if possible, or sequentially to the transmission of the wide SL-BMRS beam(s)) the narrow SL-BMRS beams in the narrow beam group will be transmitted with such narrow beams in a sequential narrow beam sweep manner, but simultaneously on all antenna panels or antenna elements comprised by or connectable to the apparatus according to the first exemplary aspect. As such, a respective narrow SL-BMRS beam of the narrow beam group may be transmitted at a same time and frequency interval on (e.g. all) antenna elements or antenna panels of the apparatus according to the first exemplary aspect. This may allow, since some UEs are limited to generating one Tx stream (e.g. Layer) for a given frequency range, that such Tx stream can be distributed to multiple antenna element or antenna panels of a respective UE, but the signal (e.g. the respective beam) transmitted from a respective antenna element or antenna panel can be identical.

According to an exemplary embodiment of all exemplary aspects, the method further comprises:

obtaining (e.g. receiving or (e.g. actively) defining) a beam sweep configuration indicative of at least the wide beam group and the narrow beam group, wherein a respective wide SL-BMRS beam of the wide beam group and a respective narrow SL-BMRS beam of the narrow beam group are transmitted based, at least in part, on the beam sweep configuration.

According to an exemplary embodiment of the first exemplary aspect, the apparatus according to the first exemplary aspect may define two beam groups, the wide beam group and the narrow beam group. Additionally or alternatively, the apparatus according to the first exemplary aspect may obtain (e.g. receive or retrieve from a memory) the wide beam group and the narrow beam group.

The beam sweep configuration may comprise or be indicative of the wide beam group and the narrow beam group. The beam sweep configuration may be obtained, by receiving the beam sweep configuration, e.g. from a network node, such as a network device (e.g. a gNB). The transmission of a/the respective wide beam(s) of the wide beam group, and/or of a/the respective narrow beam(s) of the narrow beam group may be performed and/or controlled based, at least in part, on such a beam sweep configuration.

According to an exemplary embodiment of all exemplary aspects, the method further comprises:

determining a number of needed (e.g. narrow) SL-BMRS beams to be transmitted (e.g. sent) in the narrow beam group, based on a respective antenna element of antenna panel of the apparatus having a highest number of supported narrow beams.

The needed number of (e.g. narrow) SL-BMRS beams may be set by the respective antenna element or antenna panel of the apparatus according to the first exemplary aspect that supports or is capable of transmitting a respective narrow beam in certain and multiple (e.g. at least two) different angular directions.

The result of such a determining may be comprised by the beam sweep configuration. Alternatively, the beam sweep configuration may be indicative of such a number of needed (e.g. narrow) SL BMRS beams to be sent in the narrow beam group.

According to an exemplary embodiment of the first exemplary aspect, the one or more (e.g. wide or narrow) SL-BMRS beams are transmitted (e.g. sent) with a pre-defined power per beam, wherein the pre-defined power per beam depends on an allowed overall power.

Such an allowed overall power may for instance be comprised by the beam sweep configuration. Alternatively, the beam sweep configuration may be indicative of such an allowed overall power. In addition or in the alternative, the beam sweep configuration (e.g. further) comprises, or is indicative of a respective pre-defined power per beam, e.g. for a respective wide beam and/or for a respective narrow beam.

According to an exemplary embodiment of the first exemplary aspect, the beam sweep configuration is obtained via at least one of a SL MAC CE, sidelink medium access control control element, or a RRC, radio resource control, signalling.

The beam sweep configuration may be obtained (e.g. received) by the apparatus according to the first exemplary aspect, e.g. from a network device. Further, respective definition(s) of the two beam groups—the wide beam group and the narrow beam group—and/or the beam sweep configuration that may comprise, or at least be indicative of these two beam groups, may be part of (e.g. comprised by) a respective configuration exchanged between a P-UE (e.g. apparatus according to the first exemplary aspect) and a respective S-UE (e.g. apparatus according to the second exemplary aspect). For instance, obtaining the beam sweep configuration by the apparatus according to the first exemplary aspect, e.g. from a network device, or obtaining (e.g. receiving) the respective definition(s) of the two beam groups and/or the beam sweep configuration by the apparatus according to the second exemplary aspect from the respective apparatus according to the first exemplary aspect may be done by a MAC CE or PC5 RRC signalling or be part of a resource pool configuration, e.g. as used for FR2 resource pools, to name but a few non-limiting example.

According to an exemplary embodiment of the first exemplary aspect, the method further comprises:

receiving a beam report information indicative of a quality information about at least one beam of the first set of SL-BMRS and at least one beam of the second set of SL-BMRS, in particular indicative of at least one transmitted wide SL-BMRS beam, and further indicative of at least one transmitted narrow SL-BMRS beam, wherein the respective SL-BMRS beams of the beam report information have been determined (e.g. measured) to have a highest RSRP, Reference Signal Received Power.

The quality information of the beam report information may be indicative of (e.g. the) at least one received wide SL-BMRS beam, and further indicative of (e.g. the) at least one received narrow SL-BMRS beam that were received with a highest RSRP, Reference Signal Received Power, compared to other received SL-BMRS beams, wherein the beam report information is determined based on the received at least one wide beam and on the received at least one first narrow beam and at least one second narrow beam.

For instance, the transmitted at least one wide beam, and the transmitted first narrow beam and the transmitted narrow beam may be measured by the apparatus according to the second exemplary aspect. The apparatus according to the second exemplary aspect may provide (e.g. send) a respective beam report information back to the apparatus according to the first exemplary aspect. In the respective beam report information, the best measured beam in the wide beam group and in the narrow beam group may be indicated and/or identified. This may allow the apparatus according to the first exemplary aspect to determine (e.g. extract) from the received beam report information a/the best narrow beam. The term "best" as used herewith may refer to a respective beam of the wide beam group and/or of the narrow beam group that was received by the apparatus according to the second exemplary aspect with a highest received signal power, to name but one non-limiting example.

According to an exemplary embodiment of all exemplary aspects, the narrow beam group comprises a number of narrow SL-BMRS beams corresponding to a number (e.g. at least two) of angular directions, in which at least one of the multiple antenna panels or antenna elements comprised by or connectable to the apparatus of the first exemplary aspect is enabled to transmit or emit a respective narrow SL-BMRS beam of the narrow beam group. The transmitting or emitting of such a respective narrow SL-BMRS beam in a certain angular direction may for instance be enabled by beam forming.

According to an exemplary embodiment of the first exemplary aspect, the method further comprises:

triggering an initial beam alignment between the apparatus and one or more secondary UEs, user equipments (e.g. apparatuses according to the second exemplary aspect).

The triggering of the initial beam alignment between the apparatus according to the first exemplary aspect and one or more secondary UEs may yield in that the apparatus according to the first exemplary aspect transmits the respective wide beam(s) of the wide beam group and the respective narrow beam(s) of the narrow beam group. Prior to the transmitting, a respective beam sweep configuration may be exchanged between the apparatus according to the first exemplary aspect and the respective one or more secondary UEs, e.g. apparatus(es) of the second exemplary aspect. The exchange of the beam sweep configuration may for instance be done via an established PC5 connection between the apparatus according to the first exemplary aspect and the respective one or more secondary UEs—

Likewise, according to an exemplary embodiment of the second exemplary aspect, the method further comprises:

triggering an initial beam alignment between the apparatus and a primary UE, user equipment.

According to an exemplary embodiment of the first exemplary aspect, the method further comprises:

determining, based on the beam report information, a best narrow SL-BMRS beam by overlapping a beam radiation pattern of the wide SL-BMRS beam having the highest RSRP of the wide beam group with a beam radiation pattern of the narrow SL-BMRS beam having the highest RSRP of the narrow beam group; and using the best narrow SL-BMRS beam for simultaneous beam alignment in one or more SL communications with a plurality (e.g. at least two) secondary UEs, user equipments.

The best narrow SL-BMRS beam may be determined, e.g. by overlapping a/the beam radiation pattern of the best wide beam with the beam radiation pattern of the best narrow beam.

The determining of the best narrow SL-BMRS beam may enable, at least in part that a higher number of required reference signals than the wide SL-BMRS beam(s) of the wide beam group and the narrow SL-BMRS beam(s) of the narrow beam group for beam alignment can be avoided. Further, the reducing of the number of required reference signals enables increased latency and reduces power consumption on part of the P-UE (e.g. apparatus according to the first exemplary aspect) and also on part of the one or more S-UEs (e.g. apparatus(es) according to the second exemplary aspect).

When the apparatus according to the first exemplary aspect transmits the at least one wide beam of the wide beam group, and the at least one first and second narrow beam of the narrow beam group, the apparatus according to the second exemplary aspect can receive the respective beams.

The apparatus according to the second exemplary aspect may receive the respective beams, e.g. by observing the respective beams, or more particularly, by measuring a received power of the respective beams. Based on this, at least in part, the apparatus according to the second exemplary aspect determines a beam report information indicative of a quality information.

According to an exemplary embodiment of the second exemplary aspect, the quality information is indicative of at least one received wide SL-BMRS beam, and further indicative of at least one received narrow SL-BMRS beam that were received with a highest RSRP, Reference Signal Received Power, compared to other received SL-BMRS beams, wherein the beam report information is determined based on the received at least one wide beam and on the received at least one first narrow beam and at least one second narrow beam.

For instance, the beam report information respectively the quality information may be indicative of at least one received wide SL-BMRS beam, and further indicative of at least one received narrow SL-BMRS beam that were received with a highest RSRP compared to other received SL-BMRS beams. Thus, the beam report information is determined based, at least in part, on the received at least one wide beam and on the received at least one first narrow beam and at least one second narrow beam.

According to an exemplary embodiment of the second exemplary aspect, the method further comprises:

providing the beam report information.

After the beam report information is determined, the apparatus according to the second exemplary aspect may provide the beam report information, e.g. to the apparatus according to the first exemplary aspect from which the apparatus according to the second exemplary aspect has received the at least one wide beam, and the at least one first narrow beam and at least one second narrow beam. This may be one option for the apparatus according to the first exemplary aspect to obtain (e.g. receive) the beam report information. Additionally or alternatively, the beam report information may be provided (e.g. sent) by the apparatus according to the second exemplary aspect to a network device, which may then relay the beam report information to the apparatus according to the first exemplary aspect, or may store it in a memory (e.g. database) enabling the apparatus according to the first exemplary aspect to retrieve the beam report information from the memory, to name but a few non-limiting examples.

According to an exemplary embodiment of all exemplary aspects, the beam report information comprises at least one of an index, or an identifier of the respective wide SL-BMRS beam of the wide beam group that was received with the highest RSRP and of a respective narrow SL-BMRS beam of the narrow beam group, or an identifier of a respective slot and sub-frame in which the wide SL-BMRS beam of the wide beam group that was received with the highest RSRP and of a respective narrow SL-BMRS beam of the narrow beam group was transmitted to the apparatus.

According to an exemplary embodiment of the second exemplary aspect, the method further comprises:

using the beam report information for beam alignment in a SL communication with a primary UE, user equipment from which the one or more SL-BMRS beams in the wide beam group and in the narrow beam group were received.

Thus, the apparatus according to the second exemplary aspect may use the beam report information for beam alignment in that P3 of a respective initial beam management between the apparatus according to the second exemplary aspect and the apparatus according to the first exemplary aspect can be performed and/or controlled.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding and shall be understood to complement and be read together with the description as provided in the above summary section of this specification.

Figure 1:
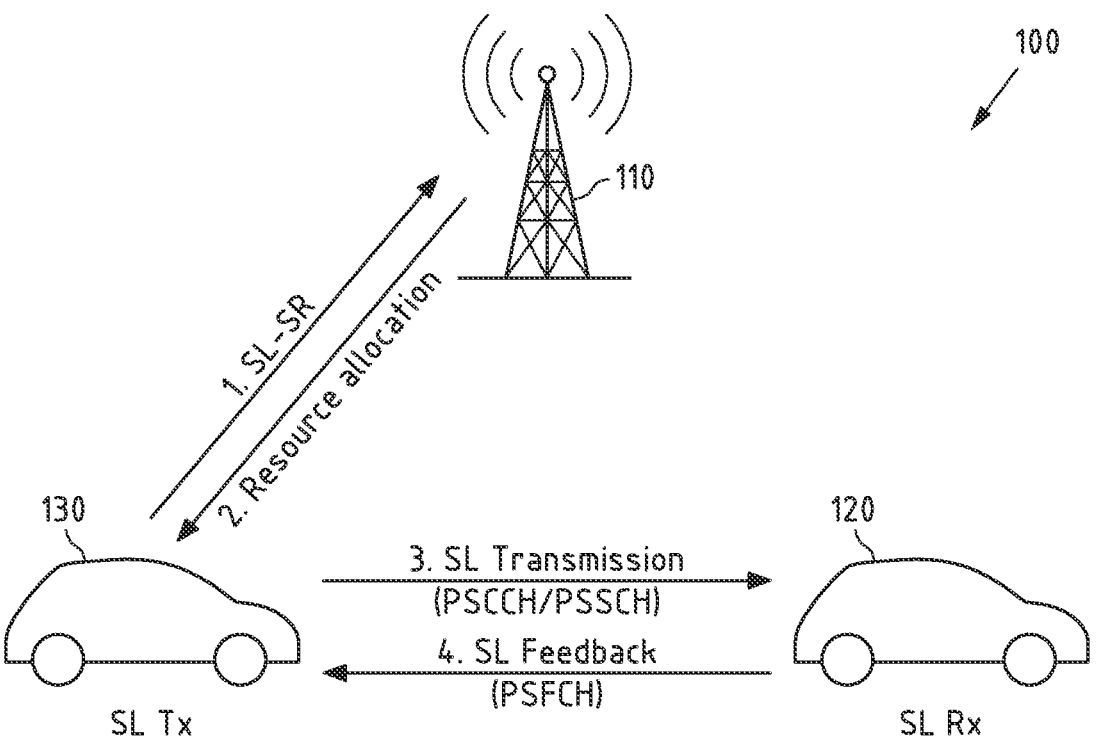
FIG. 1 a schematic block diagram of a system according to an exemplary aspect, e.g. in an example radio environment in which exemplary embodiments may be performed.

FIG. 1 is a schematic high-level block diagram of a system that may enable example embodiments according to all exemplary aspects.

The scenario shown in FIG. 1 illustrates that a UE, e.g. SL Rx UE 120 may want to establish a SL communication with another UE, e.g. SL Tx UE 130 e.g. since the latter may have connectivity to a mobile communication network—exemplary shown by the base station 110, so that via the SL Tx UE 130 the SL Rx UE 120 can uphold connectivity. Additionally or alternatively, also SL Tx UE 130 may want to exchange data with SL Rx UE 120. In this case, SL Tx UE 130 may want to establish a SL communication with SL Rx UE 120 as well, to name but a few non-limiting examples.

NR sidelink (SL) has been designed to facilitate a respective UE to communicate with other nearby UE(s) via direct/ SL communication. Two resource allocation modes have been specified, and a SL transmitter (Tx) UE is configured with one of them to perform its NR SL transmissions. These modes are denoted as NR SL FIG. 1 mode 1 and NR SL mode 2. In mode 1, a sidelink transmission resource is assigned (scheduled) by the network (NW) to the SL TX UE, while a SL TX UE in mode 2 autonomously selects its SL transmission resources.

In mode 1, where a respective network device (e.g. a gNB) is responsible for the SL resource allocation (see arrow "2. Resource allocation" between basestation 110 and SL TX 130), the configuration and operation is similar to the one over the Uu interface. This may be done based on a SL scheduling Request, SR (see arrow "1. SL-SR" between SL TX 130 and basestation 110). Then, a SL transmission (on PSCCH and/or PSSCH) may occur between SL Tx 130 and SL Rx 120 (see arrow "3. SL Transmission). The SL Rx 120 may provide feedback back to SL Tx 130 (see arrow "4. SL Feedback"), e.g. on the feedback channel PSFCH.

In mode 2, the SL UEs may perform autonomously the resource selection with the aid of a sensing procedure. More specifically, a SL Tx UE in NR SL mode 2 first performs a sensing procedure over the configured SL transmission resource pool(s), in order to obtain the knowledge of the reserved resource(s) by other nearby SL Tx UE(s). Based on the knowledge obtained from sensing, the SL Tx UE may select resource(s) from the available SL resources, accordingly. In order for a SL UE to perform sensing and obtain the necessary information to receive a SL transmission, it needs to decode the sidelink control information (SCI). Such SCI associated with a data transmission includes a 1st-stage SCI and 2nd-stage SCI.

The SCI may follow a 2-stage SCI structure, whose main motivation is to support the size difference between the SCIs for various NR-V2X SL service types (e.g. broadcast, groupcast and unicast).

The 1st-stage SCI, SCI format 1-A, carried by PSCCH and may contain or comprise:

information to enable sensing operations; and information needed to determine resource allocation of the PSSCH and to decode 2nd-stage SCI.

The 2nd-stage SCI, SCI format 2-A and 2-B, carried by PSSCH (multiplexed with SL-SCH) and may contain or comprise:

source and destination identities;

information to identify and decode the associated SL-SCH TB;

control of HARQ feedback in unicast/groupcast; and trigger for CSI feedback in unicast.

The configuration of the resources in the SL resource pool may define the minimum information required for a Rx UE to be able to decode a transmission, which includes the number of sub-channels, the number of PRBs per sub-channels, the number of symbols in the PSCCH, which slots have a PSFCH and other configuration aspects not relevant to this invention.

However, the details of the actual SL transmission (i.e., the payload) is provided in the PSCCH (1st-stage SCI) for (e.g. each) individual transmission, which may include: the time and frequency resources, the DMRS configuration of the PSSCH, the MCS, PSFCH, among others.

The configuration of the PSCCH (e.g., DMRS, MCS, number of symbols used) may be a part of the resource pool configuration. Furthermore, the indication of which slots have PSFCH symbols is also part of the resource pool configuration. However, the configuration of the PSSCH (e.g., the number of symbols used, the DMRS pattern and the MCS) is provided by the 1st-stage SCI which is the payload sent within the PSCCH.

For NR Sidelink communications, introducing beam management support (e.g. comprising initial beam alignment) for SL when operating in FR2 is to be achieved. Increased SL data rate is motivated by applications such as sensor information (video) sharing between vehicles with high degree of driving automation. Commercial use cases could require also higher data rates. Increased data rate can be achieved with the support of SL carrier aggregation and SL over unlicensed spectrum. Furthermore, by enhancing the FR2 sidelink operation, increased data rate can be more efficiently supported on FR2. While the support of new carrier frequencies and larger bandwidths may allow to improve its data rate, this may further allow to make SL more applicable for a wider range of applications. More specifically, with the support of unlicensed spectrum and the enhancement in FR2, sidelink will be in a better position to be implemented in commercial devices since utilization of the ITS band is limited to ITS safety related applications.

Example embodiments may thus comprise one or more aspects as follows:

Optimized P1 and P2 phases in SL communication may be allowed, e.g. by enabling a P-UE (e.g. apparatus according to the first exemplary aspect, such as SL Tx 130) to divide one or more SL Beam Management Reference Signals (SL-BMRS) sweeps into two different groups, a wide beam group and a narrow beam group. The SL-BMRS sweeps belonging to the first group (wide beam group), are transmitted sequentially as one wide beam per panel on or by the P-UE, while the SL-BMRS sweeps in the second group (narrow beam group) are transmitted with at least two narrow beams in a sequential narrow beam sweep manner, but simultaneously on all panels on or by the P-UE. As such, e.g. a first SL-BMRS beam of the narrow beam group is transmitted at a same time and frequency interval on all panels available on the P-UE. Likewise, a respective S-UE (e.g. apparatus according to the second exemplary aspect, such as SL Rx 120) receives the respective beams and determines a beam report information, which may be provided back to the P-UE so that beam alignment can be done under consideration of the beam report information. A respective Tx stream can then be distributed to multiple panels, but the signal transmitted from each panel will be identical after beam alignment has been performed, e.g. between the P-UE and the S-UE.

Figure 2:
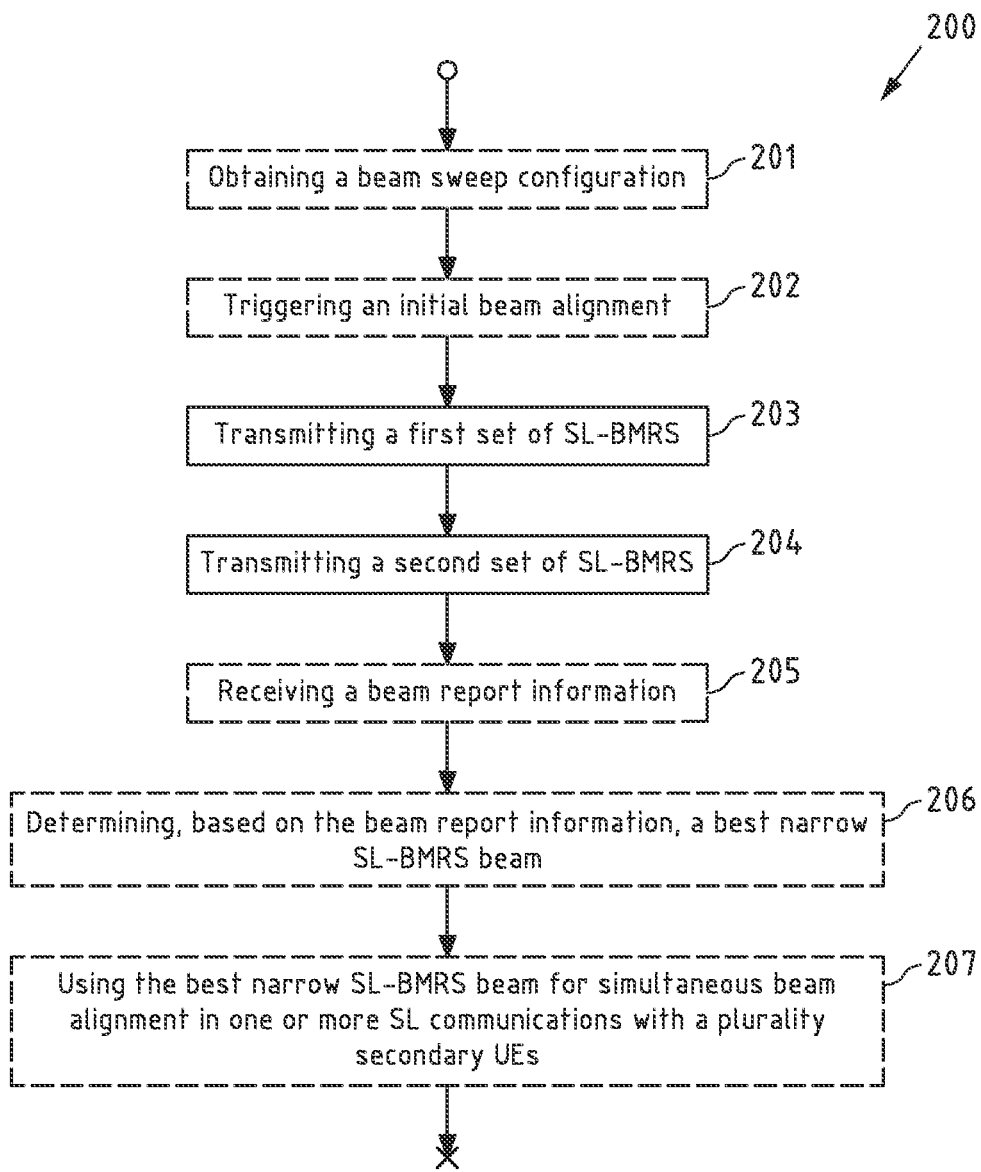
FIG. 2 a flowchart showing an example embodiment of a method according to the first exemplary aspect.

FIG. 2 is a flowchart 200 showing an example embodiment of a method according to the first exemplary aspect This flowchart 200 may for instance be performed by a UE, e.g. SL Tx UE 130 or SL Rx UE 120 of FIG. 1.

In an optional first step 201, a beam sweep configuration is obtained. The beam sweep configuration may be obtained, e.g. by receiving it from a network device (e.g. a base station). The beam sweep configuration may be obtained, e.g. by retrieving it from a memory that is comprised by, connectable to or accessible by the UE.

In an optional second step 202, an initial beam alignment is triggered, e.g. between the apparatus performing and/or controlling the flowchart 200 and another or secondary UE.

In a third step 203, a first set of SL-BMRS, e.g. comprising at least one wide beam based on a wide beam group is transmitted. The at least one wide beam may be transmitted based, at least in part, on the beam sweep configuration obtained in step 201, if step 201 was performed and/or controlled.

In a fourth step 204, a second set of SL-BMRS, e.g. comprising at least one first narrow beam and, further, e.g. subsequently at least one second narrow beam based on a narrow beam group is transmitted. The at least one narrow beam may be transmitted based, at least in part, on the beam sweep configuration obtained in step 201, if step 201 was performed and/or controlled.

In an optional fifth step 205, a beam report information is received. The at least one wide beam, and the at least one first narrow beam and, subsequently at least one second narrow beam transmitted in steps 203 and 204 may be received by another UE, e.g. a UE performing and/or controlling the flowchart of FIG. 3. Such a UE may determine the beam report information (see step 304 of FIG. 3) and provide (e.g. send) the beam report information back to the apparatus performing and/or controlling the flowchart 200.

In an optional sixth step 206, a best narrow SL-BMRS beam, based on the beam report information, is determined. This may be done e.g. by the apparatus performing and/or controlling the flowchart 200 extracting a/the best narrow beam by overlapping a respective beam radiation pattern of the best reported wide beam as represented in the obtained beam report information with a/the beam radiation pattern of the best reported narrow beam as represented in the obtained beam report information.

Figure 3:
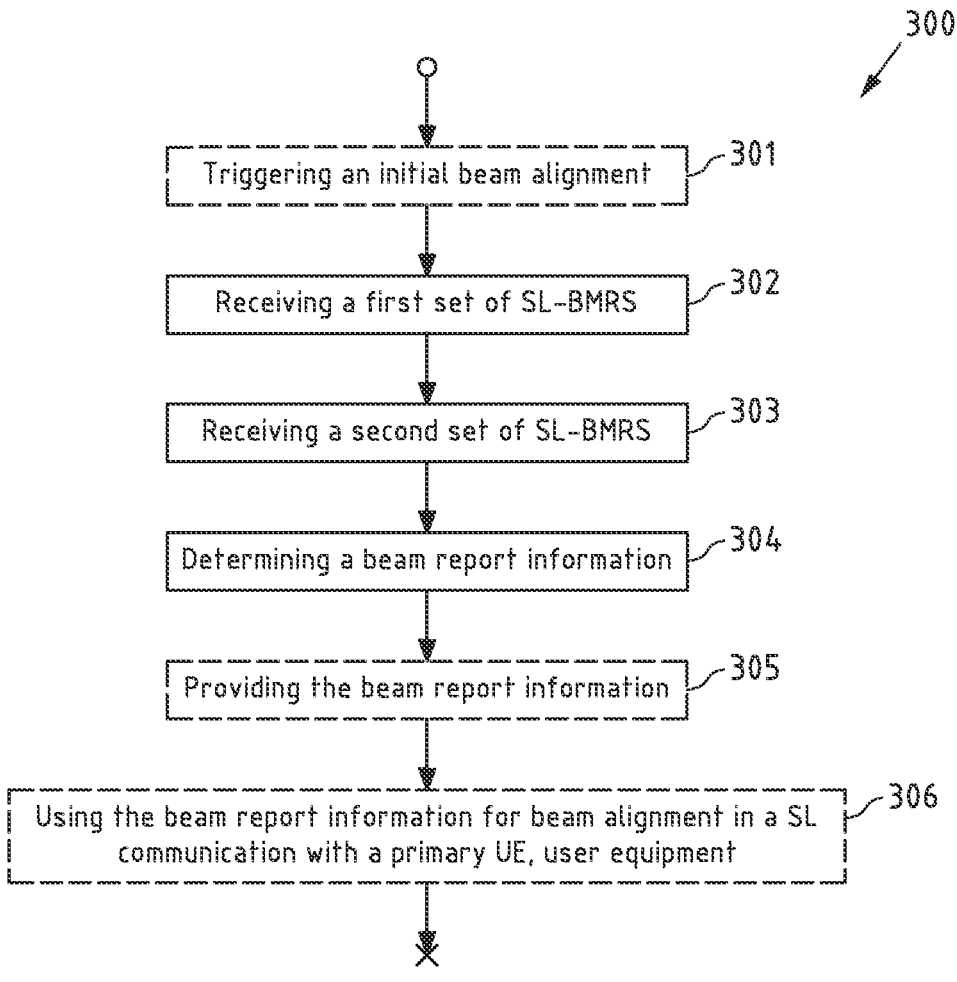
FIG. 3 a flowchart showing an example embodiment of a method according to the second exemplary aspect.

In an optional seventh step 207, the best narrow SL-BMRS beam e.g. as determined in step 206 is used for (e.g. simultaneous) beam alignment in one or more SL communications with at least one or a plurality of secondary UEs, e.g. respectively performing and/or controlling the flowchart 300 of FIG. 3.

FIG. 3 is a flowchart 300 showing an example embodiment of a method according to the second exemplary aspect. This flowchart 300 may for instance be performed by a UE, e.g. SL Rx UE 120 or SL Tx UE 130 of FIG. 1.

In an optional first step 301, an initial beam alignment is triggered. Both the apparatus of the first exemplary aspect and the apparatus of the second exemplary aspect may trigger the initial beam alignment.

In a second step 302, a first set of SL-BMRS, e.g. comprising at least one wide beam based on a wide beam group is received. The at least one wide beam is transmitted by an apparatus according to the first exemplary aspect, see step 203 of FIG. 2.

In a third step 303, a second set of SL-BMRS, e.g. comprising at least one first narrow beam and, subsequently at least one second narrow beam based on a narrow beam group is received. The at least one first narrow beam and, subsequently at least one second narrow beam are transmitted by an apparatus according to the first exemplary aspect, see step 204 of FIG. 2.

In a fourth step 304, a beam report information is determined. For instance, the respective beams received in steps 302 and 303 may be analyzed with regard to the received signal power. Then, a respective beam of the wide beam group, and a respective beam of the narrow beam group that were received with the highest signal power may be indicated in the beam report information, e.g. by explicitly comprising an identifier representing the respective wide beam and the respective narrow beam, or indicating the wide beam and the respective narrow beam accordingly, enabling a recipient of the beam report information (see step 305 and step 205 of FIG. 2) to identify which beam were received by the apparatus performing and/or controlling the flowchart 300 with such a highest received signal power.

In an optional fifth step 305, the beam report information is provided, e.g. by sending it to a respective UE from which in steps 302 and 303 the respective beams were received.

In an optional sixth step 306, the beam report information for beam alignment in a SL communication with a primary UE, user equipment is used.

Figure 4:
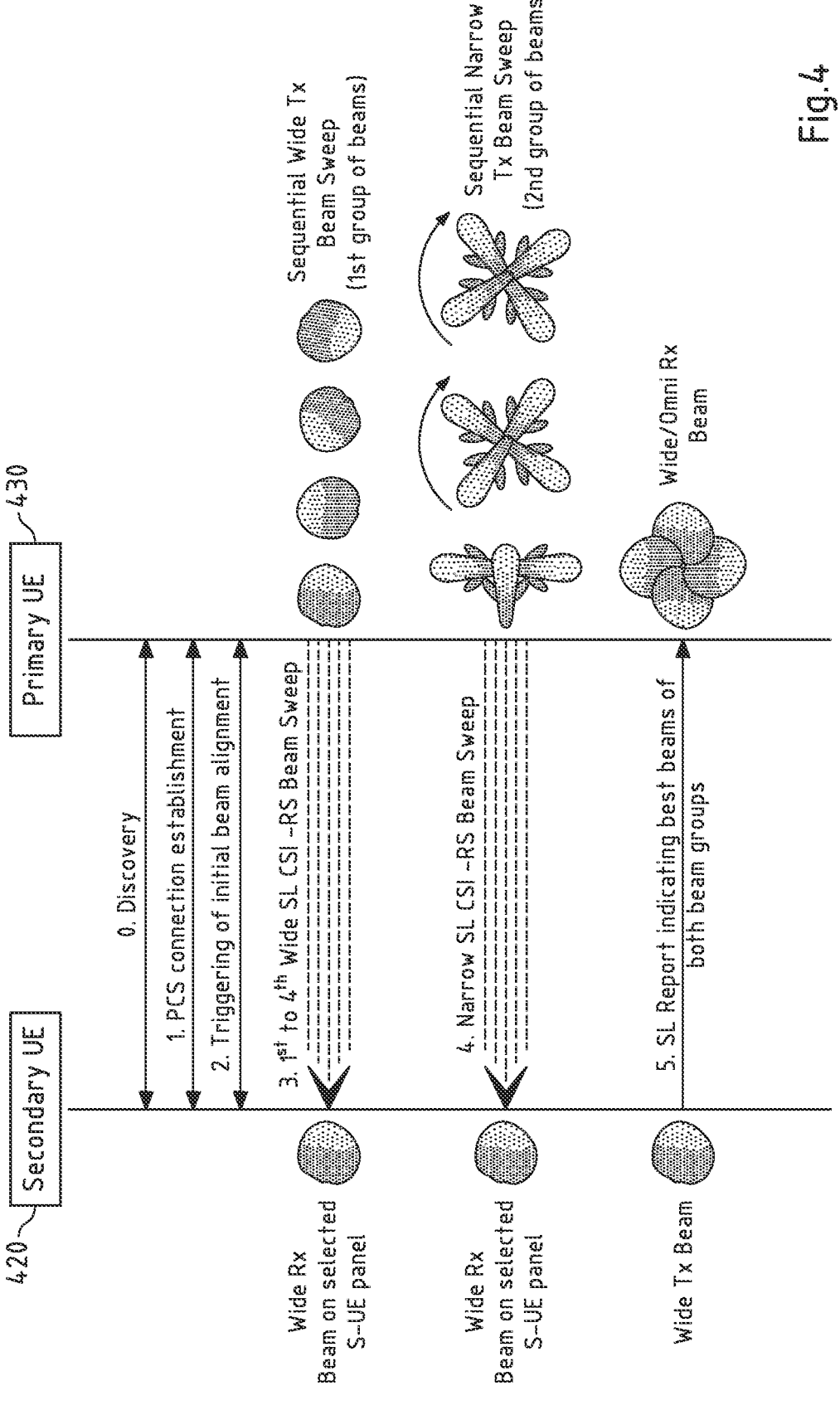
FIG. 4 shows an exemplary signaling flow chart.

FIG. 4 shows an exemplary signaling flow chart between a secondary UE 420 (e.g. apparatus according to the second exemplary aspect, e.g. SL Rx UE 120 of FIG. 1) and a primary UE 430 (e.g. apparatus according to the first exemplary aspect, e.g. SL Tx UE 130 of FIG. 1).

The resulting beam alignment procedure based on the two groups of beams—the wide beam group and the narrow beam group—is depicted in FIG. 4 and may be composed by one or more the following steps:

Step 0:

A discovery procedure is done between the S-UE 420 and the P-UE 430. The discovery procedure may follow Prose and discovery model A or B. For the case of V2x, as depicted by system 100 of FIG. 1, the discovery can occur at the V2x layer and is enabled by the exchange of CAMs in the ITS band at 5.9 GHz.

Further, the discovery procedure can occur in either FR1 or FR2. However, the benefit of doing this in FR1 may be an absence of the need to perform beam-based discovery. If applied at FR2, then it may be that discovery is limited in coverage.

Step 1:

The P-UE 430 and S-UE 420 establish a unicast link via PC5 connection establishment. This can be either be performed at FR1 or FR2. Also, via such a PC5 connection, a respective beam sweep configuration comprising, at least in part, the wide beam group and the narrow beam group, or indicating the wide beam group and the narrow beam group may be exchanged between the P-UE 430 and S-UE 420.

Step 2:

The P-UE 430 or S-UE 420 may trigger the initial beam alignment. This triggering can occur at either FR1 or FR2. Further, the triggering may include or comprise the exchange of the beam sweep configuration details, and further, additional information such as a SL-BMRS format to be used, a number of group sweeps and a number of beams in each group (e.g. of the wide beam group and of the narrow beam group), the time and frequency resource(s) where the beam sweeps are expected to occur, or a combination thereof. Such configuration details may be part of a SL MAC CE as part of the PC5-RRC configuration (e.g. during the PC5 RRC Reconfiguration exchanges or a specific PC5-RRC message for beam management) or as part of the sidelink resource pool configuration for FR2 resource pools, or a combination thereof, to name but a few non-limiting examples.

Step 3:

The P-UE 430 may performs the wide SL-BMRS beam sweep(s) associated with the first beam sweep group (e.g. the wide beam group) by transmitting the respective wide beam(s). The respective wide beam(s) may be associated with the first beam sweep group (e.g. the wide beam group). The S-UE 420 receives the respective beams, e.g. by measuring (e.g. each) of these beams and identifies the strongest one(s). The S-UE 420 may not actually receive the respective beams e.g. by fully decoding the payload, as long as it can determine e.g. a respective received signal power. The slot format used to transmit these SL-BMRS beam(s) for the purpose of beam sweeping may be pre-defined. An (e.g. each) individual SL-BMRS beam may be transmitted in a single SL slot. Therefore, if four wide beam(s) respectively sweep are required to be transmitted according to the wide beam group, then e.g. the P-UE 430 may transmit four distinct SL slots (e.g. each with a different beam applied). In case (e.g. each) wide beam(s) respectively sweep corresponds to a certain antenna panel of the P-UE 430, then these SL-BMRS beam(s) may be transmitted in the same SL slot, but at different sub-channel(s). However, if the wide beam(s) respectively sweep(s) corresponds (correspond) to respective wide beam(s) within a certain antenna panel or antenna element, then the different beam(s) may be multiplexed, e.g. in time and/or in different SL slots.

In FIG. 4, steps 3 to 5 the respective beams are illustrated by respective beam patterns. The denser the dotting of the illustrated beam pattern is, the higher the respective signal power at the respective location within the pattern may be. For instance, the beam pattern shown in the left column at step 3 thus indicates that the beam pattern is emitted "from left to right" based on the perspective of the viewer of FIG. 3, since at the right side of the beam pattern, the dotting is less dense than at the right side. Also, a "circle" shaped beam pattern indicates a respective wide beam, a narrow radiation pattern shows a directional beam that is narrower than a respective wide beam.

Step 4:

The P-UE 430 performs the narrow SL-BMRS beam sweep by transmitted the respective narrow beam(s) of the narrow group. The respective narrow beam(s) may be associated with the second beam sweep group (e.g. the narrow beam group). Upon reception, the S-UE 420 may measure (e.g. each) of these beam(s), and further, may identify the strongest one(s), thus the ones having or measured to have the highest RSRP value. The P-UE 430 simultaneously transmits one narrow beam SL-BMRS from (e.g. each) of its antenna elements or antenna panels according to or based on the narrow beam group. This is sequentially repeated for (e.g. all) of the narrow beam(s) that may be supported by the antenna panels. For instance, seven times in antenna panels that can steer a respective narrow beam in seven different angular directions, to name but one non-limiting example. For the case of antenna panels with different implementation, e.g. different number of antenna elements across panels, the number of needed SL-BMRS beam(s) (e.g. narrow beam(s)) transmitted with narrow beams may be determined by the antenna panel having or supporting the highest number of narrow beams. Sending multiple (e.g. at least two) beams simultaneously may result in a reduction of the allowed PA power per beam, e.g. in power limited scenarios, such a power limited UE might have to reduce the power per beam with up to 6 dB if configured with four beams.

However, a respective (e.g. each) narrow beam may have an increased antenna gain of 6 dB, so the overall result may in worst-case be the same, as the wide SL-BMRS beam(s), as transmitted in Step 3.

Step 5:

The S-UE 420 may report to the P-UE 430 what were the respective best beam(s) it measured in each group, the wide beam group and the narrow beam group. The reporting may be in the form of e.g. index/ID of the respective (e.g. wide and/or narrow) SL-BMRS beam received with the highest power in each group. Thus, this may be comprised by or represented by the respective beam report information. In an alternative, the S-UE 420 may also report a/the ID of the slot and sub-frame where each beam was transmitted. Thus, this may be comprised by or represented by the respective beam report information.

Figure 5A:
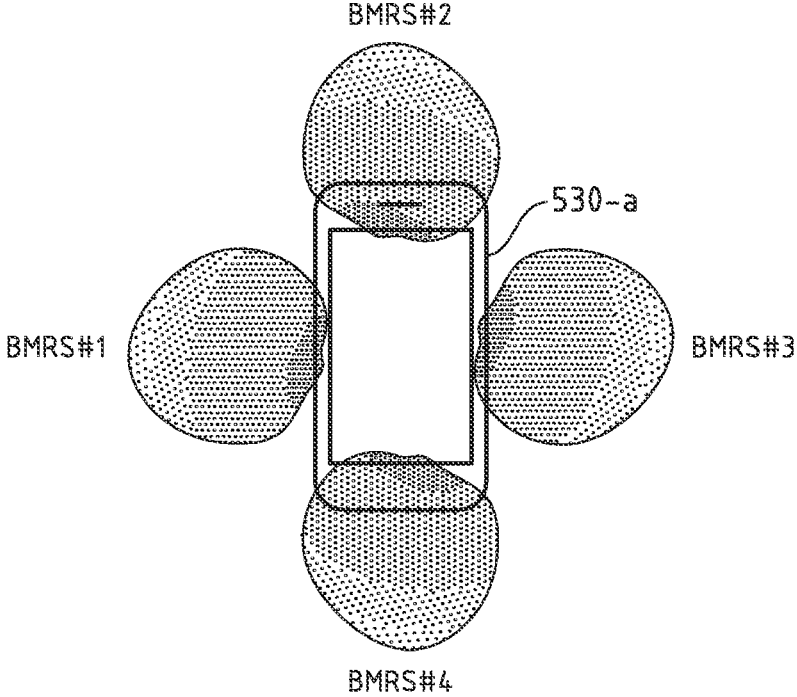
FIG. 5*a, b* show an exemplary illustration of wide beams and of narrow beams, which may be used in example embodiments of all exemplary aspects.
Figure 5B:
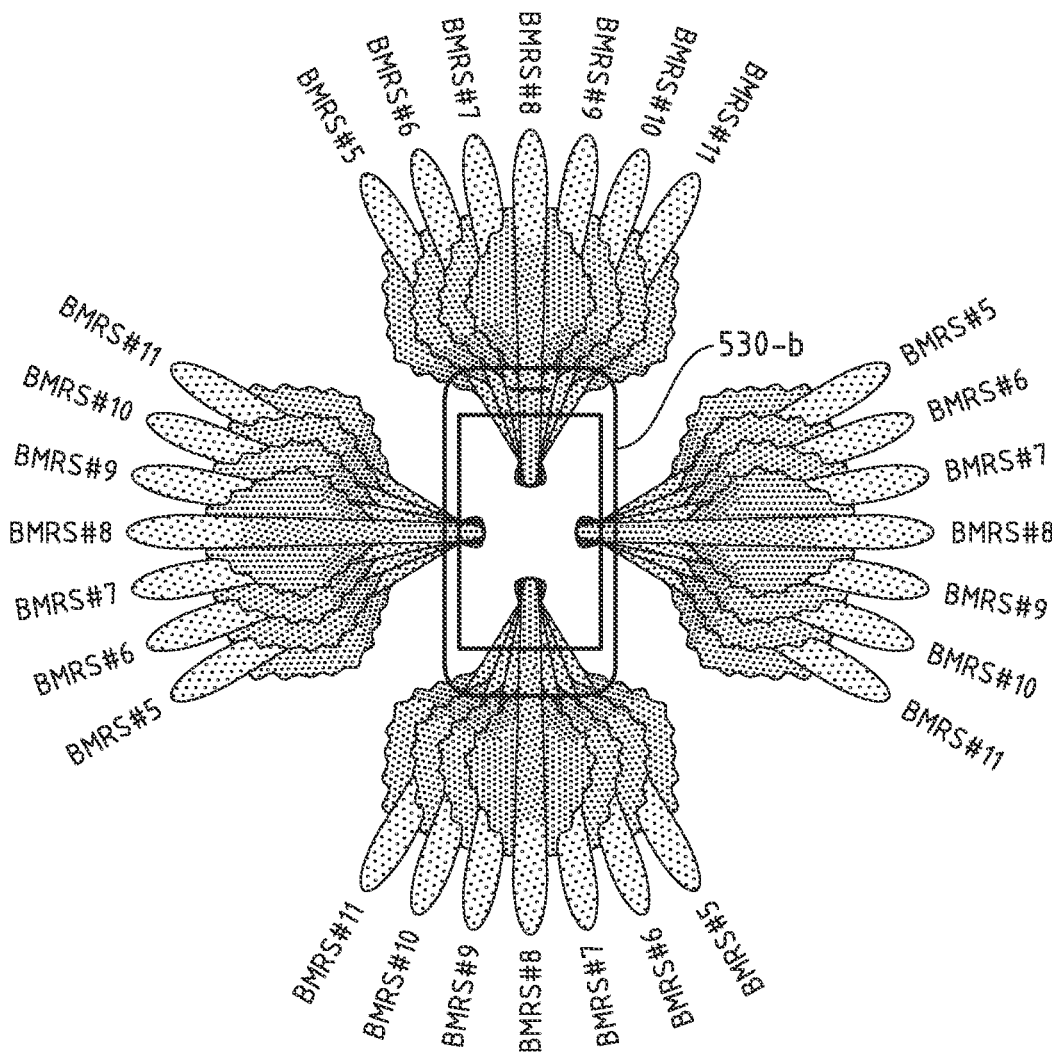

FIGS. 5a and 5b show respective exemplary illustrations of wide beams and of narrow beams, which may be used in example embodiments of all exemplary aspects. In particular, radiation pattern of such a wide beam (FIG. 5a) and narrow beam (FIG. 5b) are illustrated.

FIG. 5a shows a respective P-UE 530-a, e.g. SL Tx UE 130 of FIG. 1, and the radiation pattern when the P-UE 530-a transmits four wide beam of a respective beam group. As can be seen, from a first antenna panel or antenna element comprised by or connectable to the P-UE 530-a, a first wide beam BMRS #1 is transmitted. Then, sequentially, a second wide beam BMRS #2 is transmitted from another, different antenna panel or antenna element comprised by or connectable to the P-UE 530-a. Then, sequentially (e.g. in time), a third wide beam BMRS #3 is transmitted from a third antenna panel or antenna element comprised by or connectable to the P-UE 530-a. Then, a fourth wide beam BMRS #4 is transmitted from a fourth antenna panel or antenna element comprised by or connectable to the P-UE 530-a.

The dot density of the radiation pattern again illustrates that the respective signal power observable: the denser the dotting of the illustrated pattern is, the higher the respective and observable or receivable signal power at the respective location within the pattern is.

FIG. 5b shows a respective P-UE 530-b, e.g. SL Tx UE 130 of FIG. 1, and the radiation pattern when the P-UE 530-b transmits seven different narrows beam of a respective narrow beam group. P-UE 530-a of FIG. 5a and P-UE 530-b of FIG. 5b may actually be the same P-UE, however, for reasons of differentiability between FIGS. 5a and 5b, the reference signs differ by their ending.

As can be seen, from all four antenna panels or antenna elements comprised by or connectable to the P-UE 530-b, a first narrow beam BMRS #5 is transmitted. BMRS #5 is transmitted simultaneously by all (four) antenna elements or antenna panels. Then, subsequent to the transmitting of BMRS #5, BMRS #6 is transmitted. Again, narrow beam BMRS #6 is transmitted simultaneously by all antenna elements or antenna panels. This is repeated until all seven narrow beams—BMRS #5 to BMRS #11—of the narrow beam group have been transmitted.

This may transmitting of the respective wide beam(s) of the wide beam group, and the respective narrow beams of the narrow beam group by a respective P-UE (apparatus according to the first exemplary aspect) may allow:

Assuming four wide SL-BMRS beams and seven narrow SL-BMRS beams, in sum (e.g. only) eleven beams respectively beam sweeps are required, independently of a number of S-UE(s) (apparatus (es) according to the second exemplary aspect) that need to perform such an initial beam alignment with the P-UE. This is the same number of beam sweeps as for a respective baseline procedure as would be done in a dedicated beam alignment via uU and in the case that (e.g. only) a single S-UE wants to perform beam alignment to P-UE. The disclosed method(s) according to the first and/or second exemplary aspect, allow that such an initial beam alignment can be done in parallel with more than one S-UE with still requiring (e.g. only) eleven beams. In contrast, in such a same baseline procedure, the number of necessary beam sweeps increases with the number of S-UE. As an example, with three S-UEs requiring beam alignment to the P-UE on different beams of antenna panels or antenna elements, the disclosed method according to the first and/or second exemplary aspect reduces the number of required SL-BMRS sweeps from four wide SLBMRS+ seven*three (for three S-UEs) narrow SL-BMRS to four wide SL-BMRS+seven narrow SL-BMRS.

Figure 6:
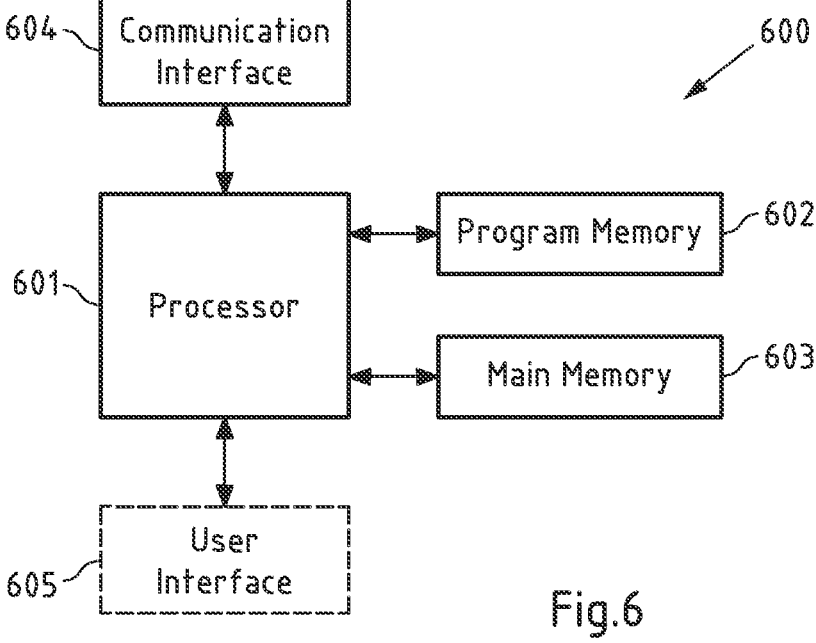
FIG. 6 a schematic block diagram of an apparatus configured to perform the method according to at least one of the first or second exemplary aspect.

FIG. 6 is a schematic block diagram of an apparatus 600 according to the first or second example aspect Apparatus 600 may for instance represent the P-UE (e.g. SL Tx UE 130 of FIG. 1) or S-UE (e.g. SL Rx UE 120 of FIG. 1).

Apparatus 600 comprises a processor 601, a program memory 602, a main memory 603, communication interface (s) 604, and a user interface 605. In various embodiments, the apparatus 600 comprises further units, parts or structural and/or functional elements. In various embodiments, apparatus 600 is a user equipment, e.g., for a cellular network like 5G NR.

Apparatus 600 may for instance be configured to perform and/or control or comprise respective means (at least one of 601 to 605) for performing and/or controlling and/or configured to perform the method according to the first or second example aspect Apparatus 600 may as well constitute an apparatus comprising at least one processor 601 and at least one memory 602 including computer program code, the at least one memory 602 and the computer program code configured to, with the at least one processor 601, cause an apparatus, e.g. apparatus 600 at least to perform and/or control the method according to the first or second example aspect.

Processor 601 may for instance further control the memories 602 to 603, and/or the communication interface(s) 904.

Processor 601 may for instance execute computer program code stored in program memory 602, which may for instance represent a computer readable storage medium comprising program code that, when executed by processor 601, causes the processor 601 to perform the method according to the first or second example aspect.

Processor 601 (and also any other processor mentioned in this specification) may be a processor of any suitable type. Processor 601 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 601 may for instance be an application processor that runs an operating system.

Program memory 602 may also be included into processor 601. This memory may for instance be fixedly connected to processor 601, or be at least partially removable from processor 601, for instance in the form of a memory card or stick. Program memory 602 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 602 may also comprise an operating system for processor 601. Program memory 602 may also comprise a firmware for apparatus 600.

Apparatus 600 may comprise a working or main memory 603, for instance in the form of a volatile memory. It may for instance be a Random Access Memory (RAM) or Dynamic RAM (DRAM), to give but a few non-limiting examples. It may for instance be used by processor 601 when executing an operating system and/or computer program.

Data memory (not shown) may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 604 enable apparatus 600 to communicate with other entities, e.g. with one or more of the apparatuses 110, 120, 130 of FIG. 1 and/or one or more of the apparatus 420, 430, 530-*a*, 530*b* of FIGS. 4 and 5, and/or network devices, e.g. of the same network. The communication interface (s) 604 may for instance comprise a wireless interface, e.g. a cellular radio communication interface and/ or a WLAN interface) and/or wire-bound interface, e.g. an IP-based interface, for instance to communicate with entities via the Internet or a network backbone, e.g. a 5G NR backbone.

Sensor(s) (not shown) are optional and may for instance comprise a gyroscope, global positioning system sensor or a received signal strength sensor.

User interface 605 is optional and may comprise a display for displaying information to a user and/or an input device (e.g. a keyboard, keypad, touchpad, mouse, etc.) for receiving information from a user.

Some or all of the components of the apparatus 600 may for instance be connected via a bus. Some or all of the components of the apparatus 600 may for instance be combined into one or more modules.

Finally, the following embodiments should also be considered to be disclosed:

Embodiment 1

A method comprising:
transmitting a first set of SL-BMRS, sidelink beam management reference signals; and
transmitting a second set of SL-BMRS;
wherein the first set of SL-BMRS is transmitted on at least one of multiple antenna panels or an antenna elements comprised by or connectable to the apparatus, and
wherein the second set of SL-BMRS is transmitted simultaneously on at least two of the multiple antenna panels or antenna elements.

Embodiment 2

The method according to embodiment 1, wherein the first set of SL-BMRS corresponds to a wide beam group comprising at least one wide beam, wherein the wide beam group is indicative of at least one wide SL-BMRS beam.

Embodiment 3

The method according to embodiment 1 or embodiment 2, wherein the second set of SL-BMRS corresponds to a narrow beam group comprising at least one first narrow beam and at least one second narrow beam, wherein the narrow beam group is indicative of at least a first narrow SL-BMRS beam and a second narrow SL-BMRS beam, wherein a respective narrow beam is narrower than the at least one SL-BMRS wide beam of the wide beam group, wherein the at least one second narrow beam is transmitted subsequently to the at least one first narrow beam.

Embodiment 4

The method according to any of the embodiments 1 to 3, wherein a respective wide beam of the wide beam group is transmitted simultaneously on the multiple antenna panels or antenna elements.

Embodiment 5

The method according to any of the embodiments 1 to 4, wherein two respective wide beams of the wide beam group are transmitted sequentially on at least two different antenna panels or antenna elements of the multiple antenna panels or antenna elements.

Embodiment 6

The method according to any of the embodiments 1 to 5, further comprising means for:
obtaining a beam sweep configuration indicative of at least the wide beam group and the narrow beam group, wherein a respective wide SL-BMRS beam of the wide beam group and a respective narrow SL-BMRS beam of the narrow beam group are transmitted based, at least in part, on the beam sweep configuration.

Embodiment 7

The method according to embodiment 6, wherein the beam sweep configuration is obtained via at least one of a SL MAC CE, sidelink medium access control control element, or a RRC, radio resource control, signalling.

Embodiment 8

The method according to any of the embodiments 1 to 7, further comprising means for:
receiving a beam report information indicative a quality information about at least one beam of the first set of SL-BMRS and at least one beam of the second set of SL-BMRS, in particular indicative of at least one transmitted wide SL-BMRS beam, and further indicative of at least one transmitted narrow SL-BMRS beam, wherein the respective SL-BMRS beams of the beam report information have been determined to have a highest RSRP, Reference Signal Received Power.

Embodiment 9

The method according to any of the embodiments 1 to 8, wherein the narrow beam group comprises a number of narrow SL-BMRS beams corresponding to a number of angular directions, in which at least one of the multiple antenna panel or antenna element is enabled to emit a respective narrow SL-BMRS beam of the narrow beam group.

Embodiment 10

The method according to any of the embodiments 1 to 9, further comprising means for:
triggering an initial beam alignment between a primary UE and one or more secondary UEs, user equipments.

Embodiment 11

The method according to any of the embodiments 8 to 10, further comprising means for:
determining, based on the beam report information, a best narrow SL-BMRS beam by overlapping a beam radiation pattern of the wide SL-BMRS beam having the highest RSRP of the wide beam group with a beam radiation pattern of the narrow SL-BMRS beam having the highest RSRP of the narrow beam group; and
using the best narrow SL-BMRS beam for simultaneous beam alignment in one or more SL communications with a plurality secondary UEs, user equipments.

Embodiment 12

A method, comprising:
receiving a first set of SL-BMRS, sidelink beam management reference signals; and
receiving a second set of SL-BMRS;
wherein the first set of SL-BMRS and the second set of SL-BMRS is received on at least one of an antenna panel or an antenna element comprised by or connectable to the apparatus; and determining a beam report information indicative of a quality information about at least one beam of the first set of SL-BMRS and at least one beam of the second set of SL-BMRS.

Embodiment 13

The method according to embodiment 12, wherein the first set of SL-BMRS corresponds to a wide beam group comprising at least one wide beam, wherein the wide beam group is indicative of at least one wide SL-BMRS beam.

Embodiment 14

The method according to embodiment 12 or embodiment 13, wherein the second set of SL-BMRS corresponds to a narrow beam group comprising at least one first narrow beam and at least one second narrow beam, wherein the narrow beam group is indicative of at least a first narrow SL-BMRS beam and a second narrow SL-BMRS beam, wherein a respective narrow beam is narrower than the at least one SL-BMRS wide beam of the wide beam group.

Embodiment 15

The method according to any of the embodiments 12 to 14, wherein the quality information is indicative of at least one received wide SL-BMRS beam, and further indicative of at least one received narrow SL-BMRS beam that were received with a highest RSRP, Reference Signal Received Power, compared to other received SL-BMRS beams, wherein the beam report information is determined based on the received at least one wide beam and on the received at least one first narrow beam and at least one second narrow beam.

Embodiment 16

The method according to any of the embodiments 12 to 15, further comprising means for:
providing the beam report information.

Embodiment 17

The method according to any of the embodiments 12 to 16, wherein the beam report information comprises at least one of an index, or an identifier of the respective wide SL-BMRS beam of the wide beam group that was received with the highest RSRP and of a respective narrow SL-BMRS beam of the narrow beam group, or an identifier of a respective slot and sub-frame in which the wide SL-BMRS beam of the wide beam group that was received with the highest RSRP and of a respective narrow SL-BMRS beam of the narrow beam group was transmitted.

Embodiment 18

The method according to any of the embodiments 12 to 17, further comprising means for:
triggering an initial beam alignment between a secondary UE, user equipment, and a primary UE.

Embodiment 19

The method according to any of the embodiments 12 to 18, further comprising means for:
using the beam report information for beam alignment in a SL communication with a primary UE, user equipment from which the one or more SL-BMRS beams in the wide beam group and in the narrow beam group were received.

Embodiment 20

A first apparatus comprising respective means for performing the method of any of embodiments 1 to 11.

Embodiment 21

A first apparatus comprising at least one processor and at least one memory including computer program code, the at least one memory and the computer program code configured to, with the at least one processor, cause an apparatus at least to perform and/or control the method according any of embodiments 1 to 11.

Embodiment 22

A second apparatus comprising respective means for performing the method of any of embodiments 12 to 19.

Embodiment 23

A second apparatus comprising at least one processor and at least one memory including computer program code, the at least one memory and the computer program code configured to, with the at least one processor, cause an apparatus at least to perform and/or control the method according any of embodiments 12 to 19.

Embodiment 24

A computer program, the computer program when executed by a processor causing an apparatus, e.g. the apparatus according to any of embodiments 20 to 23, to perform and/or control the actions and/or steps of the method of any of embodiments 1 to 19.

Embodiment 25

A computer program product comprising a computer program according to embodiment 24.

Embodiment 26

A system comprising at least a first apparatus according to any of embodiments 20 or 21 and a second apparatus according to any of embodiments 22 or 23.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

The invention claimed is:

1. An apparatus, comprising:
   at least one processor;
   at least one memory including program code;
   the at least one memory and the program code being configured to, with the at least one processor, cause the apparatus at least to:
      transmit, at least to a secondary user equipment, a first set of sidelink beam management reference signals; and
      transmit, at least to the secondary user equipment, a second set of sidelink beam management reference signals;
   wherein the first set of sidelink beam management reference signals is transmitted on at least one of multiple antenna panels or antenna elements comprised by or connectable to the apparatus, and
   wherein each of the second set of sidelink beam management reference signals is transmitted simultaneously on at least two of the multiple antenna panels.

2. The apparatus according to claim 1, wherein the first set of sidelink beam management reference signals corresponds to a wide beam group comprising at least one wide beam, and
   wherein the wide beam group is indicative of at least one wide sidelink beam management reference signals beam.

3. The apparatus according to claim 2, wherein the second set of sidelink beam management reference signals corresponds to a narrow beam group comprising at least two narrow beams,
   wherein the narrow beam group is indicative of at least a first narrow sidelink beam management reference signals beam and a second narrow sidelink beam management reference signals beam,
   wherein each of the first and second narrow beams is narrower than the at least one sidelink beam management reference signals wide beam of the wide beam group, and
   wherein the at least one second narrow beam is transmitted subsequently to the at least one first narrow beam.

4. The apparatus according to claim 2, wherein a respective wide beam of the wide beam group is transmitted simultaneously on the multiple antenna panels or antenna elements.

5. The apparatus according to claim 2, wherein two respective wide beams of the wide beam group are transmitted sequentially on at least two different antenna panels or antenna elements of the multiple antenna panels or antenna elements.

6. The apparatus according to claim 3, wherein the apparatus is further caused to:
   obtain a beam sweep configuration indicative of at least the wide beam group and the narrow beam group,
   wherein a respective wide sidelink beam management reference signals beam of the wide beam group and a respective narrow sidelink beam management reference signals beam of the narrow beam group are transmitted based, at least in part, on the beam sweep configuration.

7. The apparatus according to claim 6, wherein the beam sweep configuration is obtained via at least one of a sidelink control information, a sidelink medium access control control element, or a radio resource control, signalling.

8. The apparatus according to claim 1, wherein the apparatus is further caused to:

following the transmitting of the first and second sets of sidelink beam management reference signals, receive, at least from the secondary user equipment, a single beam report comprising beam report information indicative of a quality information about at least one beam of the first set of sidelink beam management reference signals and at least one beam of the second set of sidelink beam management reference signals, in particular indicative of at least one transmitted wide sidelink beam management reference signals beam, and further indicative of at least one transmitted narrow sidelink beam management reference signals beam, wherein the respective sidelink beam management reference signals beams of the beam report information have been determined to have a highest reference signal received power.

9. The apparatus according to claim 3, wherein the narrow beam group comprises a number of narrow sidelink beam management reference signals beams corresponding to a number of angular directions, in which at least one of the multiple antenna panel or antenna element comprised by or connectable to the apparatus is enabled to emit a respective narrow sidelink bear n ent reference signals beam of the narrow beam group.

10. The apparatus according to claim 9, wherein the apparatus is further caused to:

determine, based on the beam report information, a best narrow sidelink beam management reference signals beam by overlapping a beam radiation pattern of the wide sidelink beam management reference signals beam having the highest reference signal received power of the wide beam group with a beam radiation pattern of the narrow sidelink beam management reference signals beam having the highest reference signal received power of the narrow beam group; and use the best narrow sidelink beam management reference signals beam for simultaneous beam alignment in one or more sidelink communications with a plurality secondary user equipments.

11. An apparatus, comprising:

at least one processor;

at least one memory including program code;

the at least one memory and the program code being configured to, with the at least one processor, cause the apparatus at least to:

receive, from a primary user equipment, a first set of sidelink beam management reference signals corresponding to a wide beam group comprising at least one wide beam, wherein the first set of sidelink Beam management reference signals is received on at least one of an antenna panel or an antenna element comprised by or connectable to the apparatus, and wherein the wide beam group is indicative of at least one wide sidelink beam management reference signal beam;

receive, from the primary user equipment, a second set of sidelink beam management reference signals corresponding to a narrow beam group comprising at least two narrow beams, wherein the narrow beam group is indicative of at least a first narrow sidelink beam management reference signal beam and at least a second narrow sidelink beam management reference signal beam, and wherein each of the first and second narrow sidelink beam management reference signal beam is narrower than the at least one wide sidelink beam management reference signal beam of the wide beam group;

determine a beam report information indicative of a quality information about at least one beam of the first set of sidelink beam management reference signals and at least one beam of the second set of sidelink beam management reference signals; and provide a single beam report comprising the beam report information to the primary user equipment;

wherein the first set of sidelink beam management reference signals and the second set of sidelink beam management reference signals is received on at least one of an antenna panel or an antenna element comprised by or connectable to the apparatus.

12. A method, comprising:

transmitting a first set of sidelink beam management reference signals; and transmitting a second set of sidelink beam management reference signals;

wherein the first set of sidelink beam management reference signals is transmitted on at least one of multiple antenna panels or an antenna elements comprised by or connectable to the apparatus, and wherein the second set of sidelink beam management reference signals is transmitted simultaneously on at least two of the multiple antenna panels.

13. The method according to claim 12, wherein the first set of sidelink beam management reference signals corresponds to a wide beam group comprising at least one wide beam, and wherein the wide beam group is indicative of at least one wide sidelink beam management reference signals beam.

14. The method according to claim 13, wherein the second set of sidelink beam management reference signals corresponds to a narrow beam group comprising at least two narrow beams, wherein the narrow beam group is indicative of at least a first narrow sidelink beam management reference signals beam and a second narrow sidelink bear management reference signals beam, wherein each of the first and second narrow beams is narrower than the at least one sidelink beam management reference signals wide beam of the wide beam group, and wherein the at least one second narrow beam is transmitted subsequently to the at least one first narrow beam.

15. The method according to claim 13, wherein a respective wide beam of the wide beam group is transmitted simultaneously on the multiple antenna panels or antenna elements.

16. The method according to claim 13, wherein two respective wide beams of the wide beam group are transmitted sequentially on at least two different antenna panels or antenna elements of the multiple antenna panels or antenna elements.

17. The method according to claim 14, further comprising:

obtaining a beam sweep configuration indicative of at least the wide beam group and the narrow beam group, wherein a respective wide sidelink beam management reference signals beam of the wide beam group and a respective narrow sidelink beam management reference signals beam of the narrow beam group are transmitted based, at least in part, on the beam sweep configuration.

18. The method according to claim 17, wherein the beam sweep configuration is obtained via at least one of a sidelink control information, a sidelink medium access control control element, or a radio resource control signalling.

19. The apparatus according to claim 11, wherein the respective sidelink beam management reference signals beams of the beam report information have been determined to have a highest reference signal received power.

* * * * *